United States Patent [19]

Ohara et al.

[11] 4,251,425

[45] Feb. 17, 1981

[54] POLYCARBONATE RESIN COMPOSITION

[75] Inventors: Osamu Ohara; Kazuo Takiguchi, both of Matsuyama, Japan

[73] Assignee: Teijin Chemicals, Ltd., Tokyo, Japan

[21] Appl. No.: 968,809

[22] Filed: Dec. 12, 1978

[30] Foreign Application Priority Data

Sep. 14, 1978 [JP] Japan .................... 53-112193

[51] Int. Cl.³ .................... C08K 3/22; C08K 3/30; C08K 5/52; C08K 5/53
[52] U.S. Cl. .................... 260/37 PC; 260/45.7 P; 260/45.7 PH
[58] Field of Search .................... 260/45.7 PT, 37 PC, 260/961, 45.7 PH; 528/196

[56] References Cited

U.S. PATENT DOCUMENTS

| | | | |
|---|---|---|---|
| 2,400,577 | 5/1946 | Fon Toy | 260/961 |
| 2,437,046 | 3/1948 | Rothrock, Jr. et al. | 260/45.7 PH |
| 3,305,520 | 2/1967 | Fritz et al. | 260/45.7 PH |
| 3,398,212 | 8/1968 | Jackson, Jr. et al. | 528/125 |
| 3,412,070 | 11/1968 | Jakob et al. | 260/961 |
| 3,455,874 | 7/1969 | Charnier et al. | 260/45.75 W |
| 3,509,091 | 4/1970 | Cleveland et al. | 260/37 PC |
| 3,676,393 | 7/1972 | Piirma | 260/45.7 PS |
| 3,794,629 | 2/1974 | Eimers et al. | 260/45.8 A |
| 3,953,539 | 4/1976 | Kawase et al. | 260/45.7 PT |
| 3,998,908 | 12/1976 | Buxbaum | 260/45.7 PT |
| 4,066,617 | 1/1978 | Rawlings et al. | 260/45.8 A |
| 4,148,747 | 4/1979 | Lyons | 260/45.7 PT |

OTHER PUBLICATIONS

Goodman et al., Polyesters, vol. 1, 1965, pp. 2, 3, 142 and 143.

*Primary Examiner*—Lorenzo B. Hayes
*Assistant Examiner*—R. A. White
*Attorney, Agent, or Firm*—Sherman & Shalloway

[57] ABSTRACT

A stabilized polycarbonate resin composition comprising a polycarbonate resin and a benzenephosphonate of the general formula

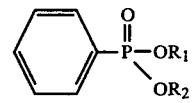

wherein $R_1$ and $R_2$, independently from each other, are selected from the class consisting of hydrogen, alkyl groups having 1 to 22 carbon atoms and cycloalkyl groups having 5 to 10 carbon atoms, at least one of $R_1$ and $R_2$ being other than hydrogen. A stabilized colored polycarbonate resin composition is also provided by further incorporating a pigment and/or dye.

15 Claims, No Drawings

POLYCARBONATE RESIN COMPOSITION

FIELD OF THE INVENTION

This invention relates to a stabilized polycarbonate resin composition comprising a polycarbonate resin and a benzenephosphonate, and to a colored polycarbonate resin composition comprising a polycarbonate resin containing a pigment and/or dye and a benzenephosphonate.

BACKGROUND OF THE INVENTION

Polycarbonate resins are used widely as engineering plastics because of their high impact strength, thermal stability and transparency, superior electrical properties and dimensional stability, and self-extinguishing properties. However, since polycarbonate resins are molded at relatively high temperatures, they turn yellow or decrease in molecular weight by heat decomposition during the molding, resulting in a reduction in mechanical strength. This defect tends to become especially outstanding during molding at high temperatures of more than 300° C. which are utilized in producing thin fabricated articles which will meet the recent need for saving resources. In particular, in the production of colored polycarbonate resins containing pigments and/or dyes, the degree of their discoloration increases, and their molecular weight decreases. Accordingly, products of the intended color or strength cannot be obtained constantly.

Organic phosphites such as triaryl phosphites or trialkyl phosphites have previously been suggested as stabilizers for preventing the discoloration or molecular weight decrease of polycarbonate resins during molding at high temperatures. Polycarbonate resins containing such phosphites have the defect that when exposed to high temperatures in air or in humidity, they become discolored or cloudy and get brittle. In an attempt to remedy this defect, the use of complex ion-type organic boron compounds (see Japanese Laid-Open Patent Publication No. 90361/78) or phosphoric acid and its esters (see U.S. Pat. No. 3,404,122) was suggested. However, these compounds do not produce a sufficient effect of preventing discoloration during molding at high temperatures.

It is an object of this invention therefore to provide a polycarbonate resin composition, especially a colored polycarbonate resin composition, which does not discolor or decrease in molecular weight during molding at high temperatures, and does not get degraded when exposed to elevated temperature in dry or humid air.

The present inventors have made various investigations in order to achieve this object, and found that a composition prepared by blending a polycarbonate resin with a benzenephosphonate not known heretofore as a heat stabilizer is free from discoloration during molding at high temperatures.

SUMMARY OF THE INVENTION

According to this invention, there is provided a stabilized polycarbonate resin composition comprising a polycarbonate resin and a benzenephosphonate of the following general formula

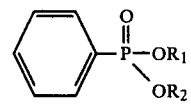

wherein $R_1$ and $R_2$, independently from each other, are selected from the class consisting of hydrogen, alkyl groups having 1 to 22 carbon atoms and cycloalkyl groups having 5 to 10 carbon atoms, at least one of $R_1$ and $R_2$ being other than hydrogen.

DETAILED DESCRIPTION OF THE INVENTION

The stabilized polycarbonate resin composition of this invention does not undergo discoloration or degradation in mechanical characteristics ascribable to molecular weight reduction during molding at high temperatures, and therefore, can be easily molded into thin shaped articles at high temperatures. Moreover, unlike conventional phosphite-containing compositions, the stabilized polycarbonate resin composition of this invention is not discolored nor does it become cloudy or brittle even when exposed to high temperatures in air or in humidity. Accordingly, the composition of this invention prepared by incorporating the benzenephosphonate of formula (1) into a transparent polycarbonate resin can retain the inherent clarity of the polycarbonate resin for a long period of time.

The benzenephosphonate of formula (1) unexpectedly exhibits a much better stabilizing effect than conventional stabilizers when used as heat stabilizers for colored polycarbonate resins containing pigments and/or dyes. Depending upon uses, polycarbonate resins must be molded into colored articles by adding pigments and/or dyes. Since the merchandize values of the colored articles depend upon their color tone, the aforesaid characteristics of the benzenephosphonates of formula (1) are of great significance. Furthermore, because of these characteristics, large quantities of pigments and/or dyes can be added to provide hiding power and color retention in thin, colored articles.

According to one preferred embodiment of the invention, there is thus provided a stabilized colored polycarbonate resin comprising a polycarbonate resin, a pigment and/or dye, and the benzenephosphonate of formula (1).

The colored polycarbonate resin composition may additionally contain an organic phosphite of the following general formula

wherein $R_1$, $R_2$ and $R_3$, independently from each other, are selected from the class consisting of hydrogen, alkyl groups having 1 to 22 carbon atoms, cycloalkyl groups having 5 to 10 carbon atoms, aryl groups having 6 to 12 carbon atoms, aralkyl groups having 7 to 24 carbon atoms and alkylaryl groups having 7 to 24 carbon atoms, at least one of $R_1$, $R_2$ and $R_3$ being other than hydrogen.

The polycarbonate resin used in this invention is produced by reacting a dihydric phenol with a carbonate precursor such as phosgene in the presence of an acid receptor and a molecular weight controlling agent, or by an ester interchange reaction between a dihydric phenol and a carbonate precursor such as diphenyl carbonate. Preferred dihydric phenols are bisphenols, and 2,2-bis(4-hydroxyphenyl)propane (to be referred to as bisphenol A) is especially preferred. Or the bisphenol A may be partly or wholly replaced by another dihydric phenol. Examples of the dihydric phenols other than bisphenol A include such phenol compounds as hydroquinone, 4,4'-dihydroxydiphenyl, bis(4-hydroxyphenyl)alkanes, bis(4-hydroxyphenyl)cycloalkanes, bis(4-hydroxyphenyl)sulfide, bis(4-hydroxyphenyl)sulfone, bis(4-hydroxydiphenyl)sulfoxide and bis(4-hydroxyphenyl)ether, and halogenated bisphenols such as bis(4-dibromo-4-hydroxyphenyl)propane. Homopolymers of these dihydric phenols, copolymers of two or more of these and blends of two or more of these polymers can also be used.

The benzenephosphonate used in this invention is a compound expressed by the following formula

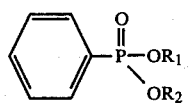
(1)

In formula (1), $R_1$ and $R_2$, independently from each other, represent hydrogen, an alkyl group with 1 to 22 carbon atoms or a cycloalkyl group with 5 to 10 carbon atoms. At least one of $R_1$ and $R_2$ should be the alkyl or cycloalkyl group. Examples of preferred alkyl groups are ethyl, butyl, octyl and dodecyl groups. Preferred cycloalkyl groups are cyclopentyl and cyclohexyl groups. Specific examples of especially preferred benzenephosphonates include monomethyl benzenephosphonate, dimethyl benzenephosphonate, monoethyl benzenephosphonate, and diethyl benzenephosphonate.

Generally, the benzenephosphonate of formula (1) is produced by reacting benzenephosphonic chloride with an alcohol.

In the colored polycarbonate composition which is a preferred embodiment, the pigment or dye to be incorporated in the composition includes, for example, inorganic and organic pigments and dyes classified in "Practical Manual of Additives for Plastics and Rubbers" at pages 791 to 797 (published by Kagaku Kogyo Sha in 1970). They specifically include, for example, metal oxides such as titanium dioxide and zinc oxide, cadmium yellow, ultramarine, and carbon black. The invention, however, is not limited to these specific colorants.

Examples of the organic phosphite to be optionally incorporated into the colored polycarbonate resin composition are diphenyl phosphite, dicresyl phosphite, bis(p-t-butylphenyl)phosphite, bis(p-hexylphenyl)phosphite, bis(nonylphenyl)phosphite, tris(2-t-butyl-5-methylphenyl)phosphite, monophenyl-dioxyethylcresyl phosphite, tris(o-cyclohexylphenyl)phosphite, tris(2-methylhexyl)phosphite, trilauryl phosphite, tri-n-octyl phosphite, tris(2-ethylhexyl)phosphite, tris(3-ethyloxetanyl-3-methyl)phosphite, tris(2-methylphenyl)phosphite, tris(4-t-butylphenyl)phosphite, tris(2,6-dimethylphenyl)phosphite, tris(2-methoxy-4-butylphenyl)phosphite, tris(nonylphenyl)phosphite, tris(mixed mono- and di-nonylphenyl)phosphite, tris(2-dodecylphenyl)phosphite, and didecylmonophenyl phosphite.

The amount of the benzenephosphonate is preferably 0.001 to 0.5 part by weight, more preferably 0.005 to 0.1 part by weight, per 100 parts by weight of the polycarbonate resin. In the colored polycarbonate resin composition of this invention, the amount of the pigment and/or dye is preferably 0.001 to 5.0 parts by weight per 100 parts by weight of the polycarbonate resin. If the organic phosphite is to be added, its amount is preferably 0.001 to 0.2 part by weight per 100 parts by weight of the polycarbonate resin.

Mixing of the polycarbonate resin with the benzenephosphonate is effected by any conventional methods, for example a method comprising adding the benzenephosphonate to a dope of a polycarbonate and then removing the solvent; a method comprising directly adding the benzenephosphonate to a polycarbonate resin powder; or a method which comprises forming a master batch of the polycarbonate containing the benzenephosphonate in a high concentration, and adding the master batch to another supply of polycarbonate so that the concentration of the additive reaches the predetermined level.

The same methods as described above can be used to mix the polycarbonate resin, pigment or dye and the optional organic phosphite to form the colored polycarbonate resin composition. These additives may be added simultaneously with, or separately from, the addition of the benzenephosphonate.

The composition of this invention may further contain additives for modifying the polycarbonate resin, for example reinforcing agents (e.g., glass fibers), antioxidants, fire retardants, light stabilizers, plasticizers, fillers, antistatic agents, mold releasing agents, lubricants, and blowing agents. The polycarbonate resin composition may further contain other resins such as polyethylene, polypropylene, polystyrene, polymethyl methacrylate, AS resin, ABS resin, polyesters, and polyphenylene oxides.

The following Examples illustrate the present invention. In these examples, all "parts" are by weight.

EXAMPLE 1

This Example illustrates the effect of the heat stabilizer of this invention on transparent polycarbonate.

A polycarbonate resin having a molecular weight of 24,500 was produced by reacting 2,2-bis(4-hydroxyphenyl)propane with phosgene. One hundred parts of a powder of the polycarbonate resin was mixed with each of the additives shown in Table 1 in the amounts indicated. They were fully mixed by a tumbler-type blender, extruded into threads at 300° C. through a 30 mm single screw extruder, and thus pelletized. The pellets were injection-molded continuously at a molding temperature of 340° C. using an injection-molding machine to form sample plates with a size of 70 mm × 50 mm × 2 mm. The L, a and b values of these sample plates, which are the parameters of their colors, were measured by a color difference meter, and the results are shown in Table 1. L is a parameter of brightness; and a and b are parameters of color hues. The value a varies over a positive to a negative number; larger +-numbers show stronger reddish tones, and larger −- numbers, stronger greenish tones. The value b also varies from a positive to a negative number; larger +-numbers indicate stronger yellowish tones, and −numbers, stronger bluish tones.

The sample plates were subjected to a heat treating test, a steam treating test and a thermal stability test by the procedures described below.

Heat treating test

A sample plate was exposed to the atmospheric air at 150° C. for 7 days, and then its L, a and b values were measured by the methods described above. The color of the heat-treated sample plate was compared with that of the sample plate before heat treating, and the degree of discoloration of the heat-treated sample plate was rated.

thermal history at a high temperature of 340° C. can be rated. Since the discoloration is mainly yellowing in this case, too, the change of the b parameter is especially important among the three parameters.

The experimental results are shown in Table 1. In Table 1, Runs Nos. 1 to 4 show experiments in accordance with this invention, and Runs Nos. 5 to 8, comparative experiments.

The results given in Table 1 show that the compositions of this invention have superior thermal stability to the comparative compositions.

TABLE 1

| Run No. | Additive Type | Amount (parts) | Color of the sample plate obtained by continuous molding | | | Color of the sample plate obtained by molding after residence | | | Color after the heat treating test | | | Difference between the light transmittance before and after the steam treatment (%) |
|---|---|---|---|---|---|---|---|---|---|---|---|---|
| | | | L | a | b | L' | a' | b' | L | a | b | |
| 1 | Dimethyl benzene-phosphonate | 0.05 | 84.4 | −0.09 | 6.65 | 84.6 | −0.10 | 6.68 | 79.1 | 0.00 | 16.9 | 1.1 |
| 2 | Dimethyl benzene-phosphonate | 0.03 | 84.2 | −0.21 | 7.02 | 84.2 | −0.30 | 6.89 | 78.7 | 0.11 | 17.7 | 1.5 |
| 3 | Diethyl benzene-phosphonate | 0.05 | 84.7 | 0 | 6.90 | 83.5 | −0.30 | 7.00 | 78.7 | 0.00 | 17.5 | 3.9 |
| 4 | Diethyl benzene-phosphonate | 0.03 | 84.6 | −0.05 | 6.49 | 84.0 | −0.61 | 7.39 | 79.9 | 0.00 | 18.4 | 3.0 |
| 5 | None | 0 | 83.4 | −0.59 | 8.21 | 79.0 | 0.05 | 14.1 | 70.8 | 2.99 | 24.1 | 1.9 |
| 6 | Tris-nonylphenyl phosphite | 0.05 | 84.0 | −0.30 | 6.75 | 83.6 | −0.30 | 7.25 | 73.9 | 0.50 | 19.4 | 74.8 |
| 7 | Triethyl phosphate | 0.05 | 83.9 | −0.95 | 7.62 | 81.9 | −1.05 | 12.5 | 75.4 | 1.50 | 21.5 | 2.0 |
| 8 | Dioctadecyl 3,5-di-t-butyl-4-hydroxy-benzylphosphonate | 0.05 | — | — | 7.78 | — | — | 8.30 | — | — | — | — |

Since the discoloration which occurs in this heat treating test is mainly yellowing, the change of b value is most important among the aforesaid parameters. Thus, when the value b of the heat treated sample plate is larger, it is judged that yellowing caused by the heat treating test is greater.

Steam treating test

A sample plate was placed in a 5-liter autoclave containing 0.5 liter of water, and treated at 120° C. for 24 hours. The light transmittance of the sample plate before the steam treatment and that of the sample plate after the steam treatment were measured at 460 nm using a spectral photometer UV-200 (a product of Shimazu Seisakusho Co., Ltd), and the difference between the measured light transmittances of the treated and untreated sample plates were determined. The results are shown in Table 1. Larger differences in light transmittance show that the sample plate is more susceptible to clouding by the steam treating test.

Thermal stability test

To evaluate the thermal stability of a polycarbonate containing the additive, the following high-temperature residence test was performed. Instead of continuously molding the pellets at 340° C. by an injection-molding machine, the pellets were caused to reside in the cylinder of the injection-molding machine at 340° C. for 10 minutes and then molded to form sample plates. The color values (L', a', b') of the sample plates were measured by a color difference meter. By comparing the color (L', a', b') of the sample plate formed by molding after the 10-minute residence with that (L, a, b) of the sample plate obtained by continuous molding without residence, the degree of discoloration caused by the

EXAMPLE 2

This Example illustrates the effect of the heat stabilizer of this invention on colored polycarbonate resins containing pigments.

One hundred parts of a powder of a polycarbonate having a molecular weight of 24,500 obtained by the reaction of 2,2-bis(4-hydroxyphenyl)propane with phosgene was mixed with 0.5 part of titanium dioxide (R-930, a tradename for a product of Ishihara Sangyo Co., Ltd.) and each of the additives shown in Table 2 in the amounts indicated. They were fully mixed by a supermixer, and pelletized by using a 30 mm single screw extruder. The pellets were continuously molded at a molding temperature of 340° C. in the same way as described in Example 1 to form sample plates. The colors (L, a, b) of the sample plates were measured.

On the other hand, in the same way as in Example 1, the pellets were caused to reside in the cylinder of an injection-molding machine at 340° C. for 10 minutes, and then molded to form sample plates. The colors (L', a', b') of the sample plates were measured. The degrees of discoloration caused by the residence of the pellets at 340° C. for 10 minutes were determined in accordance with the following equation.

$$\Delta E = \sqrt{(L-L')^2 + (a-a')^2 + (b-b')^2}$$

To determine the degree of molecular weight reduction caused by the residence of the pellets at 340° C. for 10 minutes, the molecular weight ($\overline{M}$) of the sample plates obtained by continuous molding without residence and the sample plates obtained by molding after residence were measured by a viscosity method.

The experimental results are shown in Table 2. In Table 2, Runs Nos. 1 to 4 show experiments in accordance with this invention, and Runs Nos. 5 and 6 are comparative experiments. The results given in Table 2 show that the colored polycarbonate resin compositions of this invention have superior thermal stability to the comparative compositions.

TABLE 2

| | | | Color and molecular weight of sample plates | | | | | | | |
|---|---|---|---|---|---|---|---|---|---|---|
| | Additives (amounts in parts) | | Molded at 340° C. without Residence | | | | Molded after Residence 340° C. 10 minutes | | | |
| Run No. | Benzenephosphonate | Tris(nonyl-phenyl) phosphite | L | a | b | $\overline{M}$ ($\times 10^3$) | L' | a' | b' | M ($\times 10^3$) | $\Delta E$ |
| 1 | Dimethyl benzenephosphonate (0.01) | 0 | 86.1 | 0.4 | 8.7 | 23.7 | 84.4 | 0.6 | 8.5 | 22.3 | 1.7 |
| 2 | Dimethyl benzenephosphonate (0.03) | 0 | 86.5 | 0.2 | 8.4 | 23.6 | 85.1 | 0.3 | 8.1 | 22.5 | 1.4 |
| 3 | Diethyl benzenephosphonate | 0 | 86.4 | 0.2 | 8.6 | 23.5 | 85.2 | 0.3 | 8.0 | 22.4 | 1.3 |
| 4 | Diethyl benzenephosphonate (0.01) | 0.03 | 86.0 | 0.5 | 8.6 | 23.6 | 84.6 | 0.8 | 8.9 | 22.0 | 1.5 |
| 5 | 0 | 0.05 | 86.5 | 0.1 | 8.4 | 23.5 | 83.2 | 0.8 | 9.2 | 22.2 | 3.5 |
| 6 | 0 | 0 | 82.8 | 0.8 | 9.7 | 23.7 | 80.6 | 1.1 | 13.1 | 21.3 | 4.1 |

EXAMPLE 3

Example 2 was repeated except that 0.5 part of cadmium yellow was used instead of 0.5 part of titanium dioxide, and the additives shown in Table 3 were added in the amounts indicated. The results are shown in Table 3. In Table 3, Runs Nos. 1 and 2 show experiments of this invention, and Run No. 3 is a comparative experiment.

TABLE 3

| | Benzenephosphonate | | Molecular weights of sample plates and $\Delta E$ | | |
|---|---|---|---|---|---|
| | | | Molecular weight | | |
| Run No. | Type | Amount (parts) | Molded at 340° C. without residence | Residence at 340° C. for 10 minutes | $\Delta E$ |
| 1 | Dimethyl benzene-phosphonate | 0.02 | 23.3 | 22.4 | 1.5 |
| 2 | Diethyl benzene-phosphonate | 0.02 | 23.2 | 22.5 | 1.8 |
| 3 | — | 0 | 20.1 | 19.3 | 2.7 |

What we claim is:

1. A stabilized polycarbonate resin composition comprising a polycarbonate resin and a benzenephosphonate of the general formula

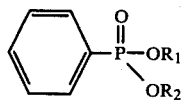

(1)

wherein $R_1$ and $R_2$, independently from each other, are selected from the class consisting of alkyl groups having 1 to 22 carbon atoms and cycloalkyl groups having 5 to 10 carbon atoms.

2. The composition of claim 1 wherein the amount of benzenephosphonate is 0.005 to 0.5 part by weight per 100 parts by weight of the polycarbonate resin.

3. The composition of claim 1 wherein the benzenephosphonate is a dialkyl benzenephosphonate.

4. A stabilized colored polycarbonate resin composition comprising a polycarbonate resin, a pigment and/or dye, and a benzenephosphonate of the general formula

(1)

wherein $R_1$ and $R_2$, independently from each other, are selected from the class consisting of alkyl groups having 1 to 22 carbon atoms and cycloalkyl groups having 5 to 10 carbon atoms.

5. The composition of claim 4 wherein the amount of the pigment and/or dye is 0.001 to 5.0 parts by weight, and the amount of the benzenephosphonate is 0.005 to 0.5 parts by weight, both per 100 parts by weight of the polycarbonate resin.

6. The composition of claim 4 or 5 wherein the benzenephosphonate is a dialkyl benzenephosphonate.

7. The composition of one of claims 4 or 5 wherein the pigment is titanium dioxide or cadmium yellow.

8. The composition of one of claims 4 or 5 which further contains an organic phosphite of the general formula $$\begin{array}{c} OR_1 \\ / \\ P-OR_2 \\ \backslash \\ OR_3 \end{array}$$ (2)

wherein $R_1$, $R_2$ and $R_3$, independently from each other, are selected from the class consisting of hydrogen, alkyl groups having 1 to 22 carbon atoms, cycloalkyl groups having 5 to 10 carbon atoms, aryl groups having 6 to 12 carbon atoms, aralkyl groups having 7 to 24 carbon atoms and alkylaryl groups having 7 to 24 carbon atoms.

9. The composition of claim 8 wherein the amount of the organic phosphite is 0.001 to 0.2 part by weight per 100 parts by weight of the polycarbonate resin.

10. The composition of claim 6 wherein the pigment is titanium dioxide or cadmium yellow.

11. The composition of claim 9 wherein the benzenephosphonate is a dialkyl benzenephosphonate.

12. The composition of claim 1 wherein the benzenephosphonate is dimethyl benzenephosphonate or diethyl benzenephosphonate.

13. The composition of claim 1 wherein the alkyl group is ethyl, butyl, octyl or dodecyl and the cycloalkyl group is cyclopentyl or cyclohexyl.

14. The composition of claim 4 wherein the benzenephosphonate is dimethyl benzenephosphonate or diethyl benzenephosphonate.

15. The composition of claim 4 wherein the alkyl group is ethyl, butyl, octyl or dodecyl and the cycloalkyl group is cyclopentyl or cyclohexyl.

* * * * *